A. C. EVANS.
SEED-DRILLS.
No. 184,234. Patented Nov. 14, 1876.
Fig. 1.
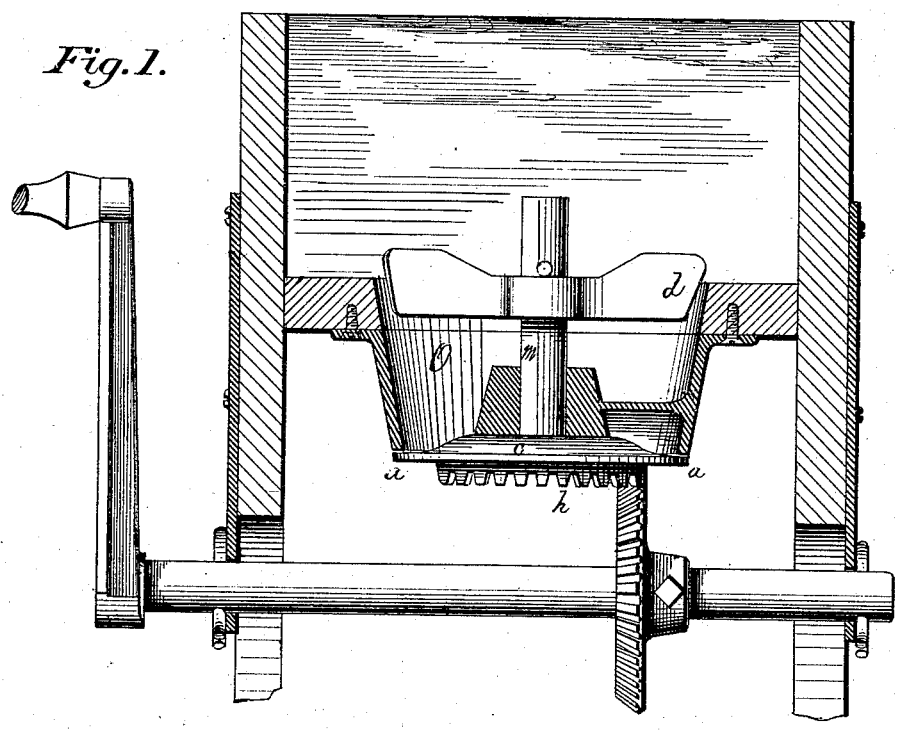
Fig. 2.
Fig. 3.
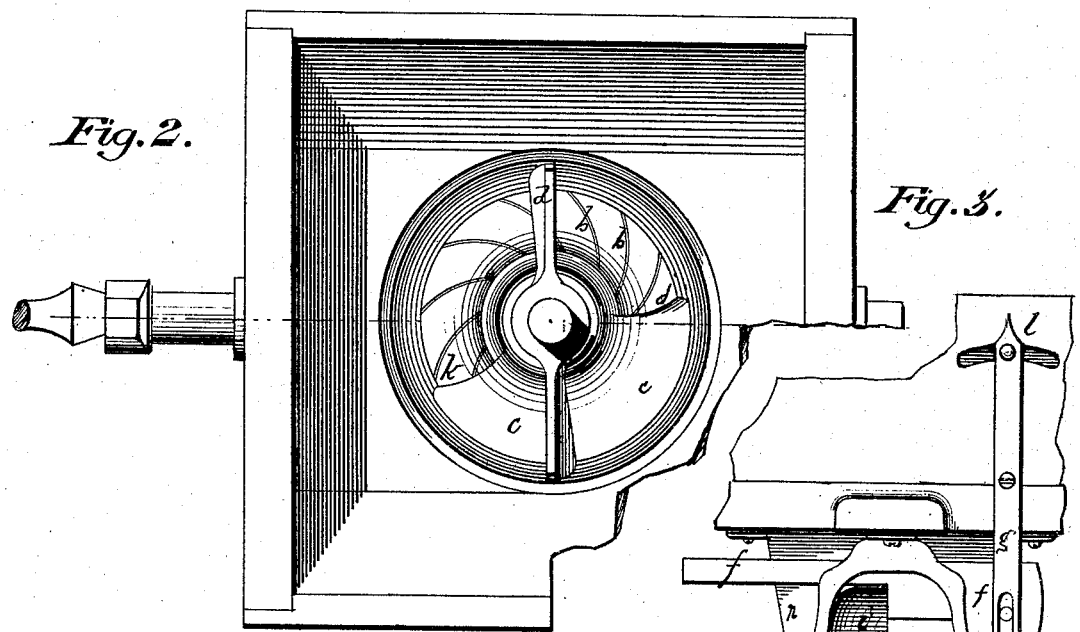
Witnesses:
Alex Mahon
John G. Center
Inventor:
Austin C. Evans
by J. D. Sharon atty

UNITED STATES PATENT OFFICE

AUSTIN C. EVANS, OF SPRINGFIELD, OHIO.

IMPROVEMENT IN SEED-DRILLS.

Specification forming part of Letters Patent No. 184,234, dated November 14, 1876; application filed June 6, 1876.

*To all whom it may concern:*

Be it known that I, AUSTIN C. EVANS, of Springfield, in the county of Clarke and State of Ohio, have invented certain new and useful Improvements in Seed-Drills; and I do hereby declare the following to be a full, clear, and exact description of the invention, such as will enable others skilled in the art to which it pertains to make and use it, reference being had to the accompanying drawings, which form part of this specification.

The object of the invention is to plant seed by a horizontal revolving-bottomed feed cup or disk, on the surface of which the seed is carried to the discharge in the side of the cup. The same is operated by cogs on the lower surface. The cover or shield extends over a portion of the revolving bottom of the cup, and over the opening for the discharge, preventing the dropping of seed when not in motion. This shield, also being placed nearly at right angles with the grooves on the revolving bottom of the cup, makes the discharge more regular, at all times admitting a uniform quantity of seed to the discharge-orifice, an agitator revolving over and through the seed, securing an equal pressure on the revolving bottom of the cup.

Figure 1 is a side elevation, showing the horizontal position of feed-cup and its operation. Fig. 2 is a top view of feed-cup, showing the grooves, shield, and agitator. Fig. 3 is a side view, showing feed-orifice, slide regulating the feed, &c.

Referring to drawings, $a$ is the revolving bottom of the feed cup or disk, operated by cogs $h$ on under surface of the same. The cover or shield $c$ opens above the disk and extends over the orifice or discharge $i$, and closes down on surface of disk at $k$, removing the pressure of the seed from the discharge-outlet, and preventing waste of seed when the disk is not in motion. The agitator $d$ keeps the seed in motion, preventing it from clogging at the mouth of the shield and keeping it from arching in the center. The slide $f$ is operated by the lever $g$ and slot $l$.

Therefore the invention is claimed as follows:

1. In combination with hopper $o$, the horizontal revolving feed-disk $a$, the discharge-orifice $i$, and the shield $c$, resting obliquely over said discharge-orifice, as and for the purposes described.

2. In a seeding-machine, the combination of agitator $d$ on shaft $m$ with feed-disk $a$, having oval surface, as and for the purposes described.

In testimony that I claim the foregoing I have hereunto set my hand this 25th day of May, 1876.

AUSTIN C. EVANS.

Witnesses:
 J. D. SHARON,
 CHAS. R. WHITE.